US012709151B2

(12) United States Patent
Lu et al.

(10) Patent No.: US 12,709,151 B2
(45) Date of Patent: Aug. 18, 2026

(54) TEMPERATURE CONTROL SYSTEM, VEHICLE, ENERGY STORAGE SYSTEM, AND MULTI-PORT VALVE

(71) Applicant: Huawei Digital Power Technologies Co., Ltd., Shenzhen (CN)

(72) Inventors: Linfeng Lu, Xi'an (CN); Malin Li, Xi'an (CN); Hao Meng, Dongguan (CN); Tao Huang, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 192 days.

(21) Appl. No.: 18/536,558

(22) Filed: Dec. 12, 2023

(65) Prior Publication Data

US 2024/0200669 A1 Jun. 20, 2024

(30) Foreign Application Priority Data

Dec. 15, 2022 (CN) ......................... 202211637056.9

(51) Int. Cl.
*F16K 11/08* (2006.01)
*B60K 11/02* (2006.01)
(Continued)

(52) U.S. Cl.
CPC .......... *B60K 11/02* (2013.01); *F16K 11/0856* (2013.01); *F16K 27/065* (2013.01);
(Continued)

(58) Field of Classification Search
CPC ..... B60K 11/02; B60H 1/00278; B60L 58/24; F16K 11/0856; F16K 27/065; F16K 5/0407
See application file for complete search history.

(56) References Cited

U.S. PATENT DOCUMENTS 11,454,330 B1 9/2022 Gray
2016/0031291 A1* 2/2016 Enomoto .............. B60K 11/02 62/189
(Continued)

FOREIGN PATENT DOCUMENTS

CN 107521305 A 12/2017
CN 113864490 A * 12/2021 .......... F16K 11/0856
(Continued)

*Primary Examiner* — Kelsey E Cary
(74) *Attorney, Agent, or Firm* — Maier & Maier, PLLC

(57) ABSTRACT

A temperature control system. The temperature control system includes a plurality of liquid pipelines and a multi-port valve. The multi-port valve includes a valve body and a valve core. The valve body has a mounting cavity, and the valve core is mounted in the mounting cavity. The valve body includes a body and a block-shaped additional portion, the mounting cavity is located on the body, and the block-shaped additional portion is attached to at least a part of a side wall of the body. The valve body includes a plurality of vias, and each via penetrates the block-shaped additional portion and a corresponding side wall of the body. Each liquid pipeline is configured to communicate with one via, there is a battery pack on at least one liquid pipeline, and the temperature control system is configured to control a temperature of the battery pack.

17 Claims, 11 Drawing Sheets

(51) Int. Cl.
*F16K 11/085* (2006.01)
*F16K 27/06* (2006.01)
*B60H 1/00* (2006.01)
*B60L 58/24* (2019.01)

(52) U.S. Cl.
CPC ...... *B60H 1/00278* (2013.01); *B60H 1/00485* (2013.01); *B60L 58/24* (2019.02)

(56) References Cited

U.S. PATENT DOCUMENTS

| | | | | |
|---|---|---|---|---|
| 2020/0171914 | A1 | 6/2020 | Han et al. | |
| 2024/0035580 | A1* | 2/2024 | Wang | F16K 11/0856 |
| 2024/0084903 | A1* | 3/2024 | Lin | F16K 31/535 |

FOREIGN PATENT DOCUMENTS

| | | | | | |
|---|---|---|---|---|---|
| CN | 216131420 | U | | 3/2022 | |
| CN | 114458789 | A | | 5/2022 | |
| CN | 216715302 | U | | 6/2022 | |
| CN | 216742987 | U | | 6/2022 | |
| CN | 217301734 | U | | 8/2022 | |
| CN | 115111398 | A | | 9/2022 | |
| CN | 217381743 | U | | 9/2022 | |
| CN | 217463322 | U | | 9/2022 | |
| CN | 115143306 | A | | 10/2022 | |
| CN | 115218001 | A | | 10/2022 | |
| CN | 115218004 | A | | 10/2022 | |
| CN | 115218005 | A | * | 10/2022 | F16K 31/535 |
| CN | 217874329 | U | | 11/2022 | |
| CN | 218031576 | U | | 12/2022 | |
| CN | 116160915 | A | | 5/2023 | |

* cited by examiner

TEMPERATURE CONTROL SYSTEM, VEHICLE, ENERGY STORAGE SYSTEM, AND MULTI-PORT VALVE

CROSS-REFERENCE TO RELATED APPLICATION

This application claims priority to Chinese Patent Application No. 202211637056.9, filed on Dec. 15, 2022, which is hereby incorporated by reference in its entirety.

TECHNICAL FIELD

The embodiments relate to the field of shunting system technologies and to a temperature control system, a vehicle, an energy storage system, and a multi-port valve.

BACKGROUND

With booming development of industries, such as new energy vehicles, energy storage stations, and the like, importance and complexity of a thermal management system gradually increase. Additionally, complexity of a liquid pipeline greatly increases. For example, in an energy storage system, functional modules that may use a liquid pipeline include: battery cooling, battery heat pump heating, battery thermistor heating, load (PCS) cooling, energy storage cabinet dehumidification, and the like. In an automobile field, motor cooling, passenger cabin cooling, heating, and the like are further involved. To implement temperature control at different positions of an entire device by using a thermal management system, many electromagnetic three-port valves need to be disposed in a liquid cooling pipeline of the thermal management system. Use of a plurality of three-port valves may cause problems of complex control, complex installation, and high costs. In addition, relatively large space is occupied.

SUMMARY

The embodiments include a temperature control system, a vehicle, an energy storage system, and a multi-port valve, to help simplify a structure of the multi-port valve and reduce a volume of the multi-port valve. A simple structure of the multi-port valve also helps reduce a leakage risk of the temperature control system.

According to a first aspect, the embodiments include a temperature control system, where the temperature control system includes a plurality of liquid pipelines and a multi-port valve. The multi-port valve includes a valve body and a valve core. The valve body has a mounting cavity, and the valve core is mounted in the mounting cavity. The valve body includes a body and a block-shaped additional portion, the mounting cavity is located on the body, and the block-shaped additional portion is attached to at least a part of a side wall of the body. The valve body includes a plurality of vias, and each via penetrates the block-shaped additional portion and a corresponding side wall of the body. Each liquid pipeline is configured to communicate with one via, there is a battery pack on at least one liquid pipeline, and the temperature control system is configured to control a temperature of the battery pack. A peripheral side of the valve core includes a plurality of separation cavities, at least two separation cavities are arranged in an axial direction of the valve core, and each separation cavity is configured to communicate with one or more vias. This solution helps simplify a structure of the multi-port valve and reduce a volume of the multi-port valve. A simple structure of the multi-port valve also helps reduce a leakage risk of the temperature control system.

In a further solution, the temperature control system further includes a heat exchanger, there is the heat exchanger on at least one liquid pipeline, and the heat exchanger is further located on a heat exchange loop including a compressor. In this solution, a temperature of liquid in the liquid pipeline is controlled by using the heat exchanger, to control the temperature of the battery pack by using the liquid pipeline.

In a further solution, a plurality of first openings are provided on an inner side wall of the body, and the first opening is an inner port of the via. The plurality of separation cavities of the valve core include a first separation cavity, and the first separation cavity communicates with a plurality of inner ports arranged in a circumferential direction of the valve core. For example, the first separation cavity communicates with two or more inner ports arranged in the circumferential direction of the valve core.

In addition, when the plurality of first openings are provided on the inner side wall of the body, and the first opening is the inner port of the via, the plurality of separation cavities of the valve core include a second separation cavity, and the second separation cavity communicates with two inner ports arranged in the axial direction of the valve core. For example, the second separation cavity communicates with two or more inner ports arranged in the axial direction of the valve core. This helps the multi-port valve adapt to distribution of the liquid pipelines in the temperature control system, and communicate with the liquid pipelines in the temperature control system.

In another solution, the multi-port valve is an eight-port valve, for example, a three-phase eight-port valve. In this solution, the valve body includes eight vias, eight inner ports are arranged into a matrix of two rows and four columns, and inner ports in each row are arranged in the circumferential direction of the valve core.

In a working mode of the multi-port valve, the valve core includes four first separation cavities, and the four first separation cavities are arranged into a matrix of two rows and two columns. Each first separation cavity communicates with two inner ports arranged in the circumferential direction of the valve core, and each first separation cavity communicates with every two inner ports in the eight inner ports, so that every two inner ports communicate with each other through a first separation cavity.

In another working mode of the multi-port valve, the valve core includes two first separation cavities and two second separation cavities, the two first separation cavities are arranged in the axial direction of the valve core, and the two second separation cavities are arranged in the circumferential direction of the valve core. Each first separation cavity communicates with the two inner ports arranged in the circumferential direction of the valve core, and each second separation cavity is arranged in the axial direction of the valve core. Each first separation cavity communicates with two inner ports in the eight inner ports, and the two inner ports are arranged in the circumferential direction of the valve core. Each second separation cavity communicates with two inner ports in the eight inner ports, and the two inner ports are arranged in the axial direction of the valve core.

In another solution, the multi-port valve is a ten-port valve, for example, a four-phase ten-port valve. The valve body of the multi-port valve includes ten vias, and inner ports that are of the ten vias and that are on the side wall of the body are respectively a first port, a second port, a third port, a fourth port, a fifth port, a sixth port, a seventh port, an eighth port, a ninth port, and a tenth port. The first port and the second port are sequentially arranged in a first direction, the third port, the fourth port, and the fifth port are sequentially arranged in the first direction, the sixth port and the seventh port are sequentially arranged in the first direction, the eighth port, the ninth port, and the tenth port are sequentially arranged in the first direction, two ends of the valve core in the axial direction are a first end and a second end, and the first direction is a direction in which the first end faces the second end. The first port, the fourth port, the seventh port, and the tenth port are sequentially arranged in the circumferential direction of the valve core.

When the valve core is specifically disposed, the plurality of separation cavities of the valve core may further include a third separation cavity and a fourth separation cavity. The third separation cavity is an L-shaped separation cavity, the third separation cavity includes a first part and a second part, the first part communicates with two inner ports arranged in the circumferential direction of the valve core, and the second part communicates with two inner ports arranged in the axial direction of the valve core. There may be an overlapping inner port in the two inner ports communicating with the first part and the two inner ports communicating with the second part. In other words, the third separation cavity communicates with three inner ports. Alternatively, the two inner ports communicating with the first part and the two inner ports communicating with the second part are completely different. In other words, the third separation cavity communicates with the four inner ports.

In a working mode of the multi-port valve, the first port and the second port communicate with each other through a second separation cavity, and the second separation cavity communicates with two inner ports arranged in the axial direction of the valve core. The fourth port, the fifth port, and the seventh port communicate with each other through a third separation cavity, and the third separation cavity communicates with three inner ports. The third port and the sixth port communicate with each other through a first separation cavity, and the first separation cavity communicates with two inner ports arranged in the circumferential direction of the valve core. The eighth port, the ninth port, and the tenth port communicate with each other through another second separation cavity, and the another second separation cavity communicates with three inner ports arranged in the axial direction of the valve core. Each inner port is in a working state.

In another working mode of the multi-port valve, the second port and the fifth port communicate with each other through a first separation cavity, and the first separation cavity communicates with two inner ports arranged in the circumferential direction of the valve core. The third port, the fourth port, and the seventh port communicate with each other through a third separation cavity, and the third separation cavity communicates with three inner ports. The eighth port, the ninth port, and the tenth port communicate with each other through a second separation cavity, and the second separation cavity communicates with three inner ports arranged in the axial direction of the valve core.

In still another working mode of the multi-port valve, the second port and the fifth port communicate with each other through a first separation cavity, and the first separation cavity communicates with two inner ports arranged in the circumferential direction of the valve core. The third port and the fourth port communicate with each other through a second separation cavity, and the second separation cavity communicates with two inner ports arranged in the axial direction of the valve core. The ninth port and the tenth port communicate with each other through another second separation cavity, and the second separation cavity communicates with two inner ports arranged in the axial direction of the valve core. In this solution, the two second separation cavities each communicate with two inner ports arranged in the axial direction of the valve core.

In yet another working mode of the multi-port valve, the first port and the fourth port communicate with each other through a first separation cavity, and the first separation cavity communicates with two inner ports arranged in the circumferential direction of the valve core. The second port and the fifth port communicate with each other through another first separation cavity, and the first separation cavity communicates with two inner ports arranged in the circumferential direction of the valve core. The seventh port and the tenth port communicate with each other through still another first separation cavity, and the first separation cavity communicates with two inner ports arranged in the circumferential direction of the valve core. The sixth port and the ninth port communicate with each other through yet another first separation cavity, and the first separation cavity communicates with two inner ports arranged in the circumferential direction of the valve core. The third port and the eighth port communicate with each other through a third separation cavity, and the third separation cavity can communicate with four inner ports and is configured to communicate with only two inner ports herein.

The four working modes of the four-phase ten-port valve in the solution are as described above. For example, the valve core may be driven to rotate by a specified angle relative to the valve body, to adjust the four working modes of the four-phase ten-port valve.

For example, when the separation cavities of the valve core are formed, the valve core may include a plurality of separation plates. The plurality of separation plates include a first separation plate and a second separation plate, the first separation plate is perpendicular to the axial direction of the valve core, the second separation plate is parallel to the axial direction of the valve core, and the plurality of separation plates form the plurality of separation cavities. Separation cavities of different properties may be formed when a separation plate is disposed or not disposed at each position based on a requirement.

When the valve body is specifically formed, the via extends along a straight line, extends in a bending manner, or extends in a curving manner. A position relationship or a communication manner between an inner port and an outer port is not limited. A layout of outer ports is not limited by a layout of inner ports. The layout of outer ports may be configured based on an actual application scenario, to simplify pipeline disposition of the temperature control system.

There are a plurality of second openings on an outer surface of the block-shaped additional portion, the second opening is an outer port of the via, and each liquid pipeline communicates with one second opening.

For example, an opening that is of the via and that is on the block-shaped additional portion is an outer port, and a plurality of outer ports are located in a same plane. This helps communicate with an external liquid pipeline, and simplifies a layout manner of the liquid pipelines in the temperature control system.

In addition, an opening that is of the via and that is on the body is an inner port, and two inner ports adjacent in a circumferential direction of the mounting cavity are spaced by a preset distance. The via is provided, so that the layout of inner ports may be not limited by the layout of outer ports, either, and a distance between the two inner ports adjacent in the circumferential direction may be relatively large. In this way, a requirement for precision of controlling a rotation angle of the valve core is relatively low, sealing between the valve body and the valve core is improved, and a leakage case of the multi-port valve is reduced.

In another solution, the body is a cylinder, the block-shaped additional portion has a groove portion, and the groove portion accommodates at least a part of a side wall of the cylinder.

To simplify a structure of the valve body, the body and the block-shaped additional portion are of an integrally formed structure. This helps simplify the structure of the valve body and reduce a volume of the valve body.

According to a second aspect, the embodiments further provide a vehicle. The vehicle includes at least a battery pack and the temperature control system according to the first aspect. The temperature control system is configured to control a temperature of the battery pack. Mounting space reserved for the temperature control system in the vehicle is relatively small, and is not easily affected by liquid leakage.

According to a third aspect, the embodiments further provide an energy storage system. The energy storage system includes at least a battery pack and the temperature control system according to the first aspect. The temperature control system is configured to control a temperature of the battery pack. Mounting space reserved for the temperature control system in the energy storage system is relatively small, and is not easily affected by liquid leakage.

According to a fourth aspect, the embodiments provide a multi-port valve. The multi-port valve includes a valve body and a valve core. The valve body has a mounting cavity, and the valve core is mounted in the mounting cavity. The valve body includes a body and a block-shaped additional portion, the mounting cavity is located on the body, and the block-shaped additional portion is attached to at least a part of a side wall of the body. The valve body includes a plurality of vias, and each via penetrates the block-shaped additional portion and a corresponding side wall of the body. A peripheral side of the valve core includes a plurality of separation cavities, at least two separation cavities are arranged in an axial direction of the valve core, and each of at least one separation cavity is configured to communicate with one or more vias. This solution helps simplify a structure of the multi-port valve and reduce a volume of the multi-port valve. A simple structure of the multi-port valve also helps reduce a leakage risk of a temperature control system.

In still another solution, a first opening is provided on an inner side wall of the body, and the first opening is an inner port of the via. The plurality of separation cavities of the valve core include a first separation cavity, and the first separation cavity communicates with a plurality of inner ports arranged in a circumferential direction of the valve core. This helps the multi-port valve adapt to distribution of liquid pipelines in the temperature control system, and communicate with the liquid pipelines in the temperature control system.

In another solution, a first opening is provided on an inner side wall of the body, and the first opening is an inner port of the via. The plurality of separation cavities of the valve core include a second separation cavity, and the second separation cavity communicates with a plurality of inner ports arranged in the axial direction of the valve core.

In another solution, the multi-port valve is an eight-port valve, for example, a three-phase eight-port valve. In this solution, the valve body includes eight vias, eight inner ports are arranged into a matrix of two rows and four columns, and inner ports in each row are arranged in the circumferential direction of the valve core.

In a working mode of the multi-port valve, the valve core includes four first separation cavities, and the four first separation cavities are arranged into a matrix of two rows and two columns. Each first separation cavity communicates with every two inner ports in the eight inner ports, so that every two inner ports communicate with each other through a first separation cavity.

In another working mode of the multi-port valve, the valve core includes two first separation cavities and two second separation cavities, the two first separation cavities are arranged in the axial direction of the valve core, and the two second separation cavities are arranged in the circumferential direction of the valve core. Each first separation cavity communicates with two inner ports in the eight inner ports, and the two inner ports are arranged in the circumferential direction of the valve core. Each second separation cavity communicates with two inner ports in the eight inner ports, and the two inner ports are arranged in the axial direction of the valve core.

In another solution, the multi-port valve is a ten-port valve, for example, a four-phase ten-port valve. The valve body of the multi-port valve includes ten vias, and inner ports that are of the ten vias and that are on the side wall of the body are respectively a first port, a second port, a third port, a fourth port, a fifth port, a sixth port, a seventh port, an eighth port, a ninth port, and a tenth port. The first port and the second port are sequentially arranged in a first direction, the third port, the fourth port, and the fifth port are sequentially arranged in the first direction, the sixth port and the seventh port are sequentially arranged in the first direction, the eighth port, the ninth port, and the tenth port are sequentially arranged in the first direction, two ends of the valve core in the axial direction are a first end and a second end, and the first direction is a direction in which the first end faces the second end. The first port, the fourth port, the seventh port, and the tenth port are sequentially arranged in the circumferential direction of the valve core.

When the valve core is specifically disposed, the plurality of separation cavities of the valve core may further include a third separation cavity. The third separation cavity is an L-shaped separation cavity, the third separation cavity includes a first part and a second part, the first part communicates with two inner ports arranged in the circumferential direction of the valve core, and the second part communicates with two inner ports arranged in the axial direction of the valve core. The fourth separation cavity communicates with three inner ports arranged in the axial direction of the valve core. There may be an overlapping inner port in the two inner ports communicating with the first part and the two inner ports communicating with the second part. In other words, the third separation cavity communicates with three inner ports. Alternatively, the two inner ports communicating with the first part and the two inner ports communicating with the second part are completely different. In other words, the third separation cavity communicates with the four inner ports.

In a working mode of the multi-port valve, the first port and the second port communicate with each other through a second separation cavity, the fourth port, the fifth port, and the seventh port communicate with each other through a third separation cavity, the third port and the sixth port communicate with each other through a first separation cavity, and the eighth port, the ninth port, and the tenth port communicate with each other through a fourth separation cavity. Each inner port is in a working state.

In another working mode of the multi-port valve, the second port and the fifth port communicate with each other through a first separation cavity, the third port, the fourth port, and the seventh port communicate with each other through a third separation cavity, and the eighth port, the ninth port, and the tenth port communicate with each other through a second separation cavity.

In still another working mode of the multi-port valve, the second port and the fifth port communicate with each other through a first separation cavity, the third port and the fourth port communicate with each other through a second separation cavity, and the ninth port and the tenth port communicate with each other through another second separation cavity.

In yet another working mode of the multi-port valve, the first port and the fourth port communicate with each other through a first separation cavity, the second port and the fifth port communicate with each other through another first separation cavity, the seventh port and the tenth port communicate with each other through still another first separation cavity, the sixth port and the ninth port communicate with each other through yet another first separation cavity, and the third port and the eighth port communicate with each other through a third separation cavity.

The four working modes of the four-phase ten-port valve in the solution are as described above. For example, the valve core may be driven to rotate by a specified angle relative to the valve body, to adjust the four working modes of the four-phase ten-port valve.

For example, when the separation cavities of the valve core are formed, the valve core may include a plurality of separation plates. The plurality of separation plates include a first separation plate and a second separation plate, the first separation plate is perpendicular to the axial direction of the valve core, the second separation plate is parallel to the axial direction of the valve core, and the plurality of separation plates form the plurality of separation cavities. Separation cavities of different properties may be formed when a separation plate is disposed or not disposed at each position based on a requirement.

When the valve body is specifically formed, the via extends along a straight line, extends in a bending manner, or extends in a curving manner. A position relationship or a communication manner between an inner port and an outer port is not limited. A layout of outer ports is not limited by a layout of inner ports. The layout of outer ports may be configured based on an actual application scenario, to simplify pipeline disposition of the temperature control system.

An opening that is of the via and that is on the block-shaped additional portion is an outer port, and a plurality of outer ports are located in a same plane. This helps communicate with an external liquid pipeline, and simplifies a layout manner of the liquid pipelines in the temperature control system.

In addition, an opening that is of the via and that is on the body is an inner port, and two inner ports adjacent in a circumferential direction of the mounting cavity are spaced by a preset distance. The via is provided, so that the layout of inner ports may be not limited by the layout of outer ports, either, and a distance between the two inner ports adjacent in the circumferential direction may be relatively large. In this way, a requirement for precision of controlling a rotation angle of the valve core is relatively low, sealing between the valve body and the valve core is improved, and a leakage case of the multi-port valve is reduced.

In another solution, the body is a cylinder, the block-shaped additional portion has a groove portion, and the groove portion accommodates at least a part of a side wall of the cylinder.

To simplify a structure of the valve body, the body and the block-shaped additional portion are of an integrally formed structure. This helps simplify the structure of the valve body and reduce a volume of the valve body.

BRIEF DESCRIPTION OF DRAWINGS

FIG. 1(*b*) is another schematic diagram of a topology of a temperature control system according to an embodiment:

DETAILED DESCRIPTION OF EMBODIMENTS

Figure 1A:
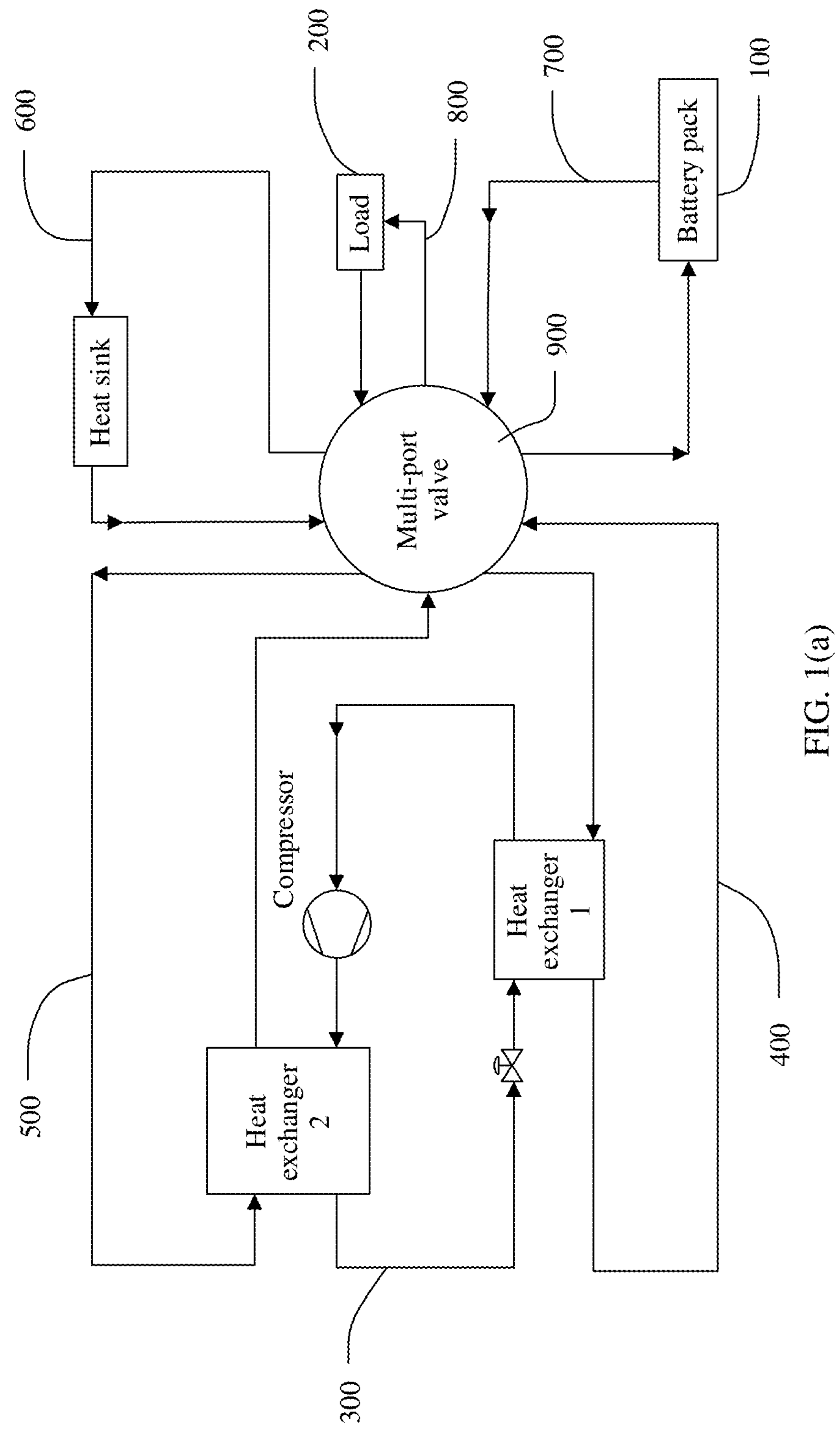
FIG. 1(*a*) is a schematic diagram of a topology of a temperature control system according to an embodiment.

To make the objectives, solutions, and some advantages of the embodiments clearer, the following further describes the embodiments in detail with reference to the accompanying drawings. However, example implementations may be implemented in a plurality of forms and should not be construed as being limited to implementations described herein. On the contrary, these implementations are provided such that the embodiments are more comprehensive and complete and fully conveys the concept of the example implementations to a person skilled in the art. Same reference numerals in the accompanying drawings denote same or similar structures. Therefore, repeated description thereof is omitted. Expressions of positions and directions in the embodiments are described by using the accompanying drawings as an example. However, changes may also be made as required, and all the changes fall within the scope of the embodiments. The accompanying drawings are merely used to illustrate relative position relationships and do not represent an actual scale.

Terms used in the following embodiments are merely intended to describe embodiments, but are not intended as limiting. Singular expressions such as “one”, “a”, “the foregoing”, “the”, and “the one” are also intended to include expressions such as “one or more”, unless the contrary is clearly indicated in the context. It should be further understood that, in the following embodiments, “at least one” and “one or more” mean one, two, or more.

Reference to “an embodiment”, “some embodiments”, or the like indicates that one or more embodiments includes a specific feature, structure, or characteristic described with reference to the embodiments. Therefore, statements such as “in an embodiment”, “in some embodiments”, “in some other embodiments”, “in other embodiments”, and the like that appear at different places do not necessarily mean reference to a same embodiment. Instead, the statements mean “one or more but not all of embodiments”, unless otherwise specifically emphasized in another manner. The terms “include”, “contain”, “have”, and their variants all mean “include but are not limited to”, unless otherwise specifically emphasized in another manner.

In addition, descriptions of “first”, “second”, “third”, and the like in embodiments are merely intended to distinguish between different specific structures, and the structures may have a same feature.

It should be noted that specific details are set forth in the following description to provide a thorough understanding of the embodiments. However, the embodiments can be implemented in numerous other manners different from those described herein, and a person skilled in the art may make similar inferences without departing from the connotation of the embodiments. Therefore, the embodiments are not limited to specific implementations below. Example implementations are subsequently described, but the descriptions are intended to describe general principles of the embodiments and are not intended to limit the scope of the embodiments.

To facilitate understanding of a temperature control system, a vehicle, an energy storage system, and a multi-port valve provided in embodiments, the following describes application scenarios of the temperature control system, the vehicle, the energy storage system, and the multi-port valve. The temperature control system may be a liquid cooling system, a heating system, a hydraulic system, or the like. Additionally, the temperature control system includes a plurality of liquid pipelines. Liquid diversion, liquid confluence, and the like are involved between the plurality of liquid pipelines, and a pipeline in which liquid flowing needs to be adjusted. For example, a temperature control system of the vehicle or a temperature control system of the energy storage system may use the temperature control system in embodiments. For example, the temperature control system of the vehicle may be configured to control a temperature of the temperature control system of the vehicle, and the temperature control system of the energy storage system may be configured to control a temperature of the temperature control system of the energy storage system. In the conventional technology, a valve group including a plurality of three-port valves may be disposed for implementation. However, according to this solution, a control process is relatively complex, a quantity of connected components is relatively large, and a leakage risk is relatively high. In addition, the valve group of the temperature control system has a large volume and occupies more space.

Figure 1B:
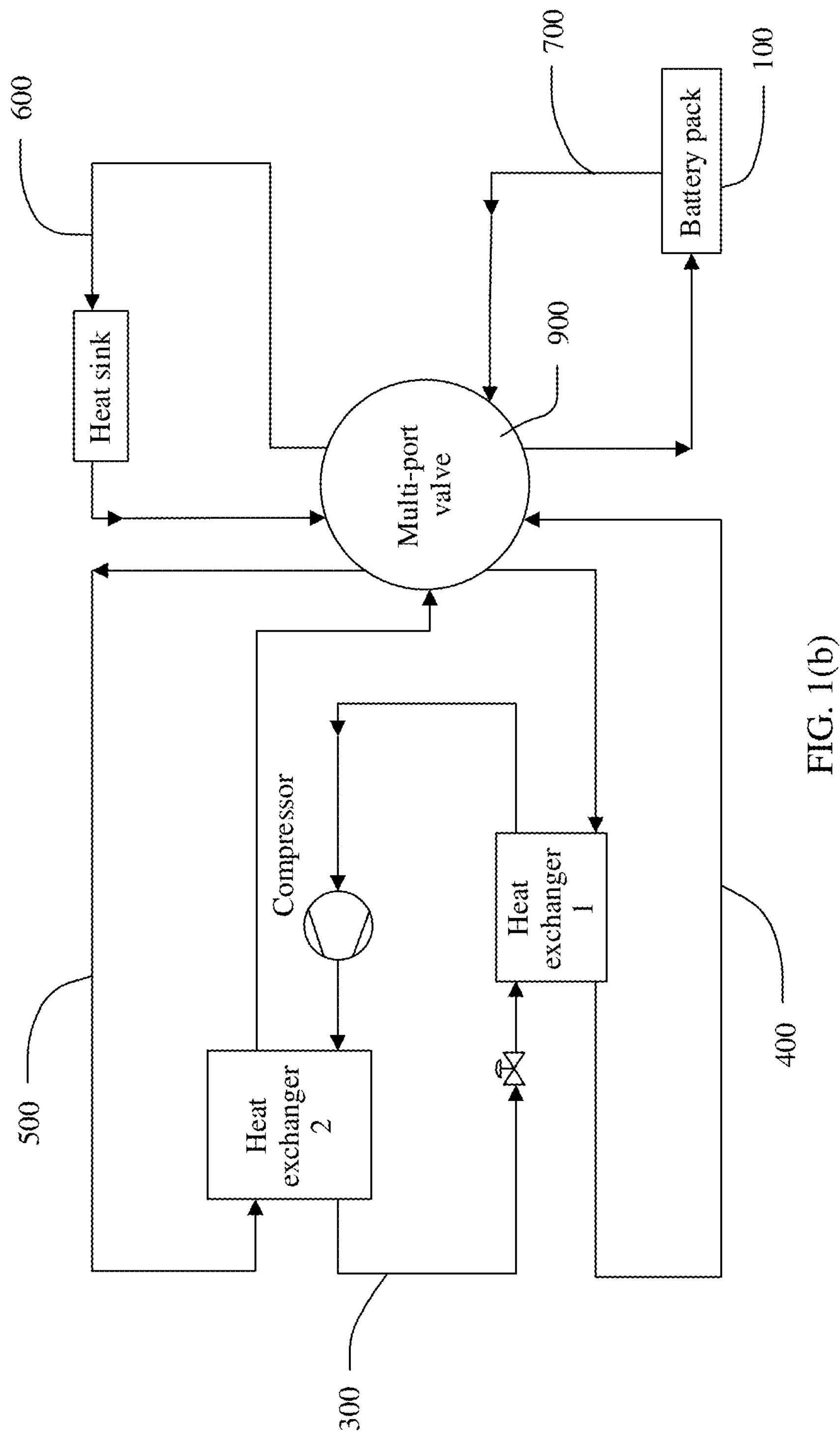

FIG. 1(*a*) and FIG. 1(*b*) are a schematic diagram of two topologies of a temperature control system according to an embodiment. The temperature control system includes a plurality of liquid pipelines and a multi-port valve 900. The liquid pipelines communicate with the multi-port valve. There is a battery pack 100 on at least one liquid pipeline, and the temperature control system is configured to control a temperature of the battery pack. For example, the temperature control system may dissipate heat for the battery pack or heat the battery pack based on an actual working environment, so that the battery pack works under an appropriate temperature condition.

As shown in FIG. 1(*a*), in an embodiment, there is a heat exchanger on at least one liquid pipeline, and the heat exchanger is further located on a heat exchange loop 300 including a compressor. The temperature control system may be further configured to control a temperature of a load 200. The multi-port valve 900 in this embodiment is a ten-port valve. The temperature control system includes the heat exchange loop 300, a warming loop 400, a first cooling loop 500, a second cooling loop 600, a battery pack temperature control loop 700, and a load temperature control loop 800. The warming loop 400 and the first cooling loop 500 are both connected to the heat exchange loop 300 for heat exchange. For example, the warming loop 400 exchanges heat with the heat exchange loop 300 by using a heat exchanger, and the first cooling loop 500 exchanges heat with the heat exchange loop 300 by using another heat exchanger. The battery pack temperature control loop 700 is connected to the battery pack 100 for heat conduction, and is configured to control the temperature of the battery pack 100. The load temperature control loop 800 is connected to the load 200 for heat conduction, and is configured to control the temperature of the load 200. The first cooling loop 500, the second cooling loop 600, the battery pack temperature control loop 700, and the load temperature control loop 800 are all connected to valve ports of the multi-port valve 900. In this way, the multi-port valve can be controlled based on an actual application scenario, so that different loops communicate with each other.

As shown in FIG. 1(*b*), in another specific embodiment, the multi-port valve 900 is an eight-port valve. A difference between this embodiment and the embodiment shown in FIG. 1(*a*) lies only in that neither the load 200 nor the load temperature control loop 800 is included.

The temperature control system may be a temperature control system of a vehicle. For example, the vehicle includes at least a battery pack and the temperature control system, and the temperature control system is configured to control a temperature of the battery pack of the vehicle. In addition, the temperature control system may alternatively be a temperature control system of an energy storage system. The energy storage system includes a battery pack and the temperature control system, and the temperature control system is configured to control a temperature of the battery pack of the energy storage system.

Figure 2:
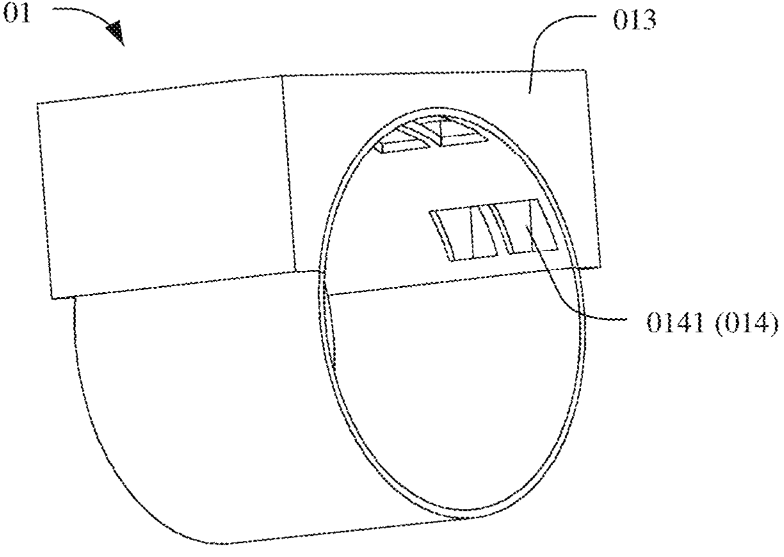
FIG. 2 is a schematic diagram of a structure of a valve body of a multi-port valve according to an embodiment.
Figure 3:
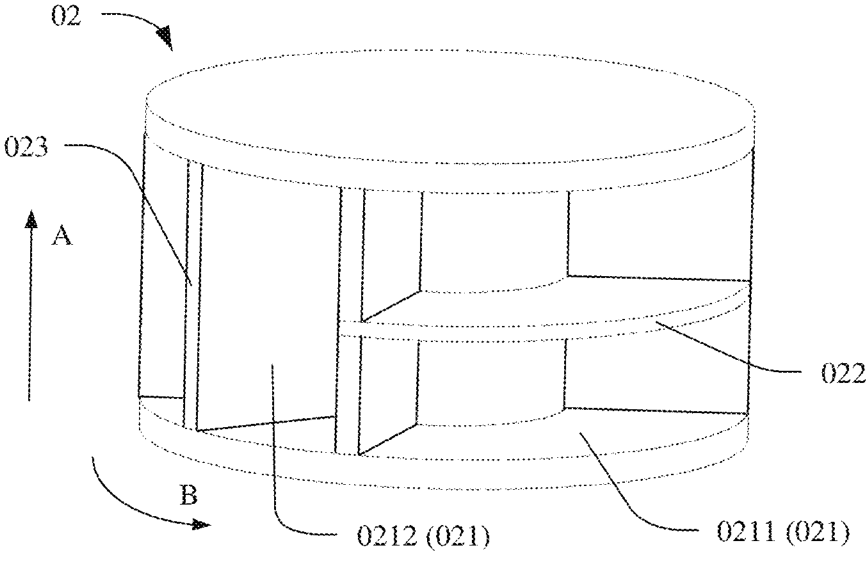
FIG. 3 is a schematic diagram of a structure of a valve core of a multi-port valve according to an embodiment.

FIG. 2 is a schematic diagram of a structure of a valve body of a multi-port valve according to an embodiment. FIG. 3 is a schematic diagram of a structure of a valve core of a multi-port valve according to an embodiment. The valve body shown in FIG. 2 and the valve core shown in FIG. 3 are assembled to form a main body part of the multi-port valve in this embodiment. As shown in FIG. 2 and FIG. 3, in this embodiment, the multi-port valve includes a valve body 01 and a valve core 02. The valve body 01 has a mounting cavity 011, and the valve core 02 is mounted in the mounting cavity 011. The valve body 01 includes a body 012 and a block-shaped additional portion 013. The body 012 and the block-shaped additional portion 013 are fastened to form the valve body 01. For example, the mounting cavity 011 is located on the body 012. The valve body 01 includes a plurality of vias 014 communicating with the mounting cavity 011. For example, each liquid pipeline is configured to communicate with one via. The block-shaped additional portion 013 is attached to at least a part of a side wall of the body 012, and each via 014 penetrates the block-shaped additional portion 013 and a corresponding side wall of the body 012.

In embodiments, "configured to" indicates a capability of a structure, and is different from an actual connection relationship. For example, "A is configured for B" indicates that A has a related capability and can perform a function of B. However, actually, in a scenario or various scenarios, A may not implement the function of B.

Optionally, as shown in FIG. 2, the body 012 is of a cylindrical structure.

Optionally, as shown in FIG. 2, the block-shaped additional portion 013 is of a block structure including a groove portion, the body 012 that is of a cylindrical structure is clamped into the groove portion of the block-shaped additional portion 013, and a part of the side wall of the body 012 is in contact with a concave surface of the groove portion of the block-shaped additional portion 013.

Optionally, as shown in FIG. 2, an outer surface of the block-shaped additional portion 013 is a plane, and the outer surface of the block-shaped additional portion 013 is a surface that is of the block-shaped additional portion 013 and that is away from the groove portion.

A peripheral side of the valve core 02 includes a plurality of separation cavities 021, at least two separation cavities 021 are arranged in an axial direction A of the valve core, and each separation cavity 021 is configured to communicate with one or more vias 014. In this embodiment, a relative position relationship between the valve core 02 and the valve body 01 is adjusted, so that the separation cavity 021 can communicate with different vias 014, to change a communication relationship of a pipeline communicating with the multi-port valve. For example, in this embodiment, only one valve core 02 needs to be mounted in the valve body 01 of the multi-port valve, to implement adjustment in a mode of a liquid path communicating with the multi-port valve. This solution helps simplify a structure of the multi-port valve and reduce a volume of the multi-port valve. A simple structure of the multi-port valve also helps reduce a leakage risk of a temperature control system.

A first opening that is of the via 014 and that is on the body 012 (such as a first opening on an inner side wall of the body 012) is an inner port 0141, or a first opening that is of the via 014 and that is on the side wall that is of the valve body 01 and that is on the periphery side of the mounting cavity 011 is an inner port 0141. The inner port 0141 is configured to communicate with the separation cavity 021 of the valve core 02. A second opening that is of the via 014 and that is on the block-shaped additional portion 013 (such as a second opening on the outer surface of the block-shaped additional portion 013) is an outer port 0142, or a second opening that is of the via 014 and that is on a surface that is of the block-shaped additional portion 013 and that is away from the mounting cavity 011 is an outer port 0142. The outer port 0142 is configured to communicate with an external liquid pipeline, so that the multi-port valve is connected to the temperature control system. The inner port 0141 communicates with the outer port 0142 through the via 014.

The block-shaped additional portion 013 has a preset volume, to enable the via 014 to have at least specific disposition space. In this case, the block-shaped additional portion 013 may not be a square block. Selection may be performed based on an actual requirement. In other words, there is a preset distance between a surface of the mounting cavity 011 and the surface that is of the block-shaped additional portion 013 and on which the outer port 0142 is provided, to properly provide the via 014 based on a requirement. According to this solution, a position of the outer port 0142 may be specified based on a requirement. This facilitates communication between the multi-port valve and the pipeline, and helps improve pipeline communication regularity.

As shown in FIG. 3, the plurality of separation cavities 021 of the valve core 02 include a first separation cavity 0211 and a second separation cavity 0212. The first separation cavity 0211 extends in a circumferential direction B of the valve core, so that the first separation cavity 0211 can communicate with a plurality of inner ports 0141 arranged in the circumferential direction B of the valve core. Adjacent first separation cavities 0211 are arranged in the axial direction A of the valve core. The second separation cavity 0212 can communicate with a plurality of inner ports 0141 arranged in the axial direction A of the valve core. Adjacent second separation cavities 0212 are arranged in the circumferential direction B of the valve core. In this solution, the first separation cavity 0211 and the second separation cavity 0212 are properly provided, so that the inner ports 0141 arranged in the circumferential direction B of the valve core can communicate with each other, and the inner ports 0141 arranged in the axial direction A of the valve core can also communicate with each other. This helps the multi-port valve adapt to distribution of liquid pipelines in the temperature control system, and communicate with the liquid pipelines in the temperature control system.

In a specific embodiment, the separation cavity 021 of the valve core 02 communicates with at least two inner ports 0141. For example, the separation cavity 021 may communicate with two inner ports 0141, or may communicate with three inner ports 0141, or may communicate with more inner ports 0141. This is not limited in the embodiments. Selection may be performed based on an actual requirement.

Still refer to FIG. 3. To form the plurality of separation cavities 021 of the valve core 02, the valve core 02 may include a plurality of separation plates. The plurality of separation plates include a first separation plate 022 and a second separation plate 023. The first separation plate 022 is perpendicular to the axial direction A of the valve core, the second separation plate 023 is parallel to the axial direction A of the valve core, and the plurality of separation plates form the plurality of separation cavities 021. In an embodiment, the first separation plate 022 and the second separation plate 023 may be arranged based on a requirement, to form different layouts of the separation cavities 021, so as to implement the multi-port valve having different shunting manners.

In an embodiment, the mounting cavity 011 is a cylindrical mounting cavity 011, the valve core 02 is a cylindrical valve core 02, and the valve core 02 and the mounting cavity 011 are mounted in a coaxial manner. The valve core 02 is mounted in the mounting cavity 011 of the valve body 01, and may circumferentially rotate in the mounting cavity 011. For example, the multi-port valve may further include a driver. The driver is connected to the valve core 02, and is configured to drive the valve core 02 to rotate by a specified angle in the mounting cavity 011 of the valve body 01. When the valve core 02 rotates to a specified position, at least two inner ports 0141 communicate with one separation cavity 021, so that the inner ports 0141 communicating with the separation cavity 021 communicate with each other. The valve core 02 is controlled to rotate to different positions, so that different inner ports 0141 can communicate with each other, to change a communication solution of the multi-port valve.

In an embodiment, the body 012 and the block-shaped additional portion 013 may be of an integrally formed structure. For example, if the valve body 01 is a valve body 01 made of a plastic material, the valve body 01 that is of the integrally formed structure may be prepared by using an injection molding process: or if the valve body 01 is a valve body 01 made of a metal material, the valve body 01 that is of the integrally formed structure may be prepared by using a casting process.

In another embodiment, the body 012 and the block-shaped additional portion 013 may alternatively be of a split structure, and the body 012 and the block-shaped additional portion 013 are fastened by using a soldering process or the like, to form the valve body 01.

The via 014 between the inner port 0141 and the outer port 0142 may extend along a straight line, extend in a bending manner, or extend in a curving manner. This is not limited in the embodiments. For example, the via 014 between the inner port 0141 and the outer port 0142 extends along a straight line. That the inner port 0141 and the outer port 0142 extend in a bending manner means that the via 014 is formed by a plurality of straight-line sub-vias 014 communicating with each other. Alternatively, the inner port 0141 and the outer port 0142 extend in a curving manner means that the via 014 extends along a curve.

Also, a position relationship or a communication manner between the inner port 0141 and the outer port 0142 is not limited. A layout of outer ports 0142 is not limited by a layout of inner ports 0141. Therefore, the layout of outer ports 0142 may be configured based on an actual application scenario, to simplify pipeline disposition of the temperature control system.

For example, the plurality of outer ports 0142 may be located in a same plane. This helps communicate with an external liquid pipeline, and simplifies a layout manner of the liquid pipelines in the temperature control system.

In addition, the via 014 is provided, so that the layout of inner ports 0141 may be not limited by the layout of outer ports 0142, either, and two inner ports 0141 adjacent in a circumferential direction of the mounting cavity 011 may be spaced by a preset distance. In this solution, a distance between the two inner ports 0141 adjacent in the circumferential direction may be relatively large. In this way, a requirement for precision of controlling a rotation angle of the valve core 02 is relatively low, sealing between the valve body 01 and the valve core 02 is improved, and a leakage case of the multi-port valve is reduced.

As shown in FIG. 2 and FIG. 3, in an embodiment, the body 012 is a cylinder, and the mounting cavity 011 is located inside the cylinder. An outline of the body 012 is consistent with a shape of the internal mounting cavity 011. This helps reduce a volume of the valve body 01. In addition, the block-shaped additional portion 013 has the groove portion, and the groove portion accommodates at least a part of a side wall of the cylinder. The outer surface of the block-shaped additional portion 013 is a plane. This helps improve overall shape regularity of the multi-port valve and enable the plurality of outer ports 0142 to be located on a same plane.

As shown in FIG. 2 and FIG. 3, in an embodiment, the multi-port valve a three-phase eight-port valve. The valve body 01 of the multi-port valve includes eight vias 014. Correspondingly, the valve body 01 includes eight inner ports 0141 and eight outer ports 0142 that communicate with each other in a one-to-one correspondence manner. The valve core 02 includes two layers of separation cavities 021 arranged in the axial direction A of the valve core.

Figure 4:
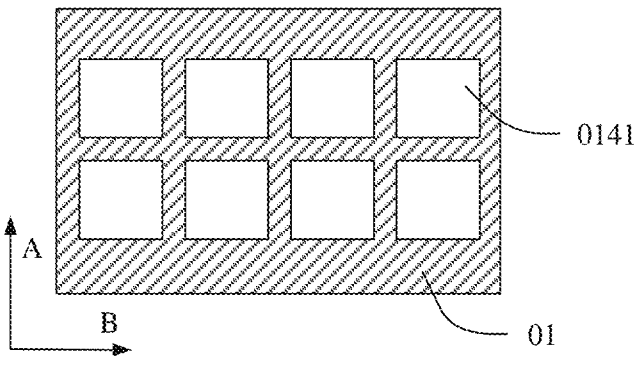
FIG. 4 is a schematic diagram of expansion of a surface of a mounting cavity of a valve body according to an embodiment.

FIG. 4 is a schematic diagram of expansion of the surface of the mounting cavity 011 of the valve body 01 according to an embodiment. As shown in FIG. 4, in this embodiment, eight vias 014 are arranged into a matrix of two rows and four columns at an opening of the side wall of the body 012, that is, the eight inner ports 0141 are arranged into a matrix of two rows and four columns. In a further embodiment, four inner ports 0141 are arranged in a row in the circumferential direction of the mounting cavity 011, and the circumferential direction of the mounting cavity 011 may be the circumferential direction B of the valve core. Two inner ports 0141 are arranged in a row in an axial direction of the mounting cavity 011, and the axial direction of the mounting cavity 011 may be the axial direction A of the valve core.

Figure 5:
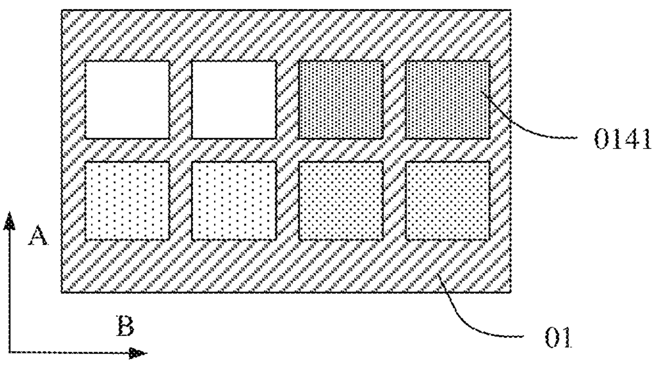
FIG. 5 is a schematic diagram of a correspondence between an inner port of a valve body of a multi-port valve and a separation cavity according to an embodiment.
Figure 5:
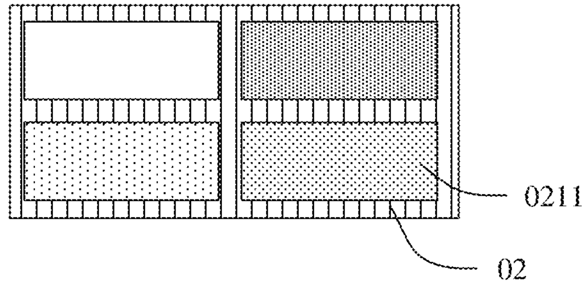

FIG. 5 is a schematic diagram of a correspondence between an inner port 0141 of the valve body 01 of the multi-port valve and a separation cavity 021 according to an embodiment. In the figure, a separation cavity 021 communicates with an inner port 0141 having a same filling pattern as the separation cavity 021. As shown in FIG. 5, in an embodiment, the valve core 02 includes four first separation cavities 0211, and the four first separation cavities 0211 are arranged into a matrix of two rows and two columns. Each first separation cavity 0211 communicates with every two inner ports 0141 in the eight inner ports 0141, so that every two inner ports 0141 communicate with each other through a first separation cavity 0211, and each inner port 0141 communicates with the first separation cavity 0211, to serve as a working status of the multi-port valve.

Figure 6:
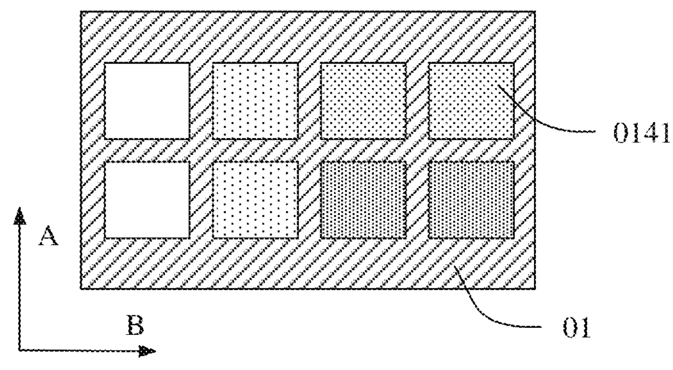
FIG. 6 is a schematic diagram of another correspondence between an inner port of a valve body of a multi-port valve and a separation cavity according to an embodiment.
Figure 6:
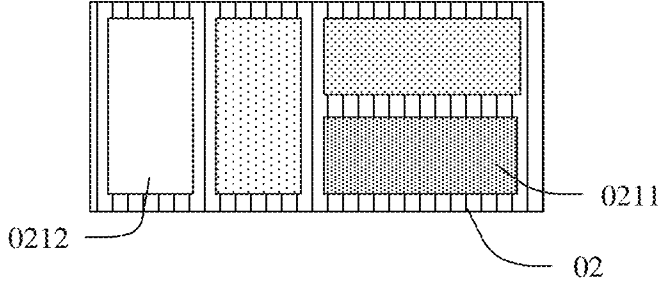
Figure 7:
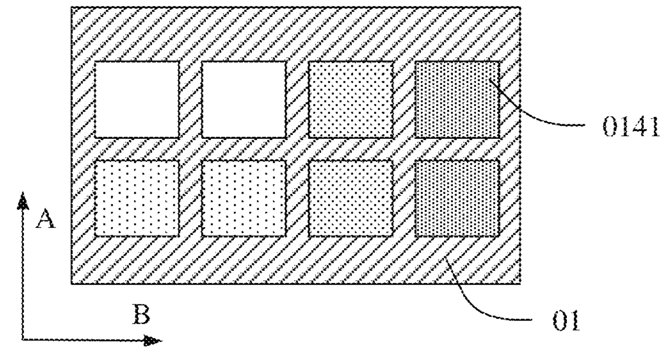
FIG. 7 is a schematic diagram of still another correspondence between an inner port of a valve body of a multi-port valve and a separation cavity according to an embodiment.
Figure 7:
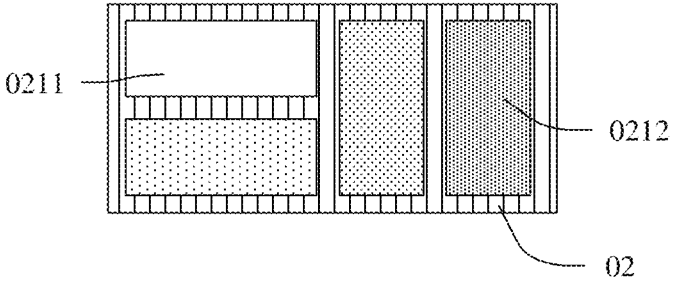

FIG. 6 is a schematic diagram of another correspondence between an inner port 0141 of the valve body 01 of the multi-port valve and a separation cavity 021 according to an embodiment. FIG. 7 is a schematic diagram of still another correspondence between an inner port 0141 of the valve body 01 of the multi-port valve and a separation cavity 021 according to an embodiment. In the figure, a separation cavity 021 communicates with an inner port 0141 having a same filling pattern as the separation cavity 021. As shown in FIG. 6 and FIG. 7, in another embodiment, the valve core 02 includes two first separation cavities 0211 and two second separation cavities 0212. The two first separation cavities 0211 are arranged in the axial direction A of the valve core, and the two second separation cavities 0212 are arranged in the circumferential direction B of the valve core. Each first separation cavity 0211 communicates with two inner ports 0141 in the eight inner ports 0141, and the two inner ports 0141 are arranged in the circumferential direction B of the valve core. Each second separation cavity 0212 communicates with two inner ports 0141 in the eight inner ports 0141, and the two inner ports 0141 are arranged in the axial direction A of the valve core. An arrangement relationship between the first separation cavity 0211 and the second separation cavity 0212 is not limited. For example, in the embodiment shown in FIG. 6, the separation cavities 021 of the valve core 02 are sequentially the two second separation cavities 0212 and the two first separation cavities 0211. In the embodiment shown in FIG. 7, the separation cavities 021 of the valve core 02 are sequentially the two first separation cavities 0211 and the two second separation cavities 0212.

In an embodiment, FIG. 5, FIG. 6, and FIG. 7 show three working modes of the three-phase eight-port valve in this embodiment. For example, the valve core 02 may be driven to rotate by a specified angle relative to the valve body 01, to adjust the three working modes of the three-phase eight-port valve.

Figure 8:
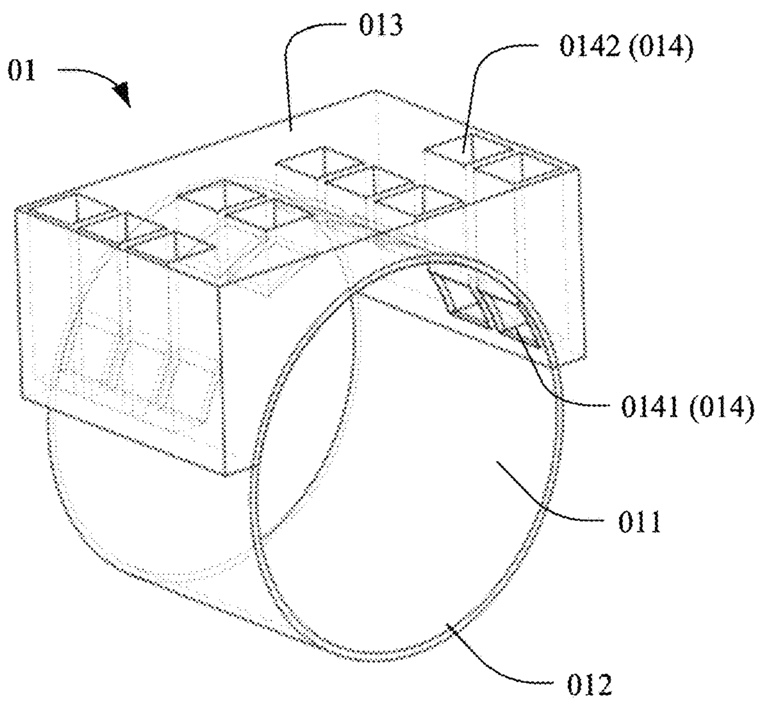
FIG. 8 is a schematic diagram of another structure of a valve body according to an embodiment.
Figure 9:
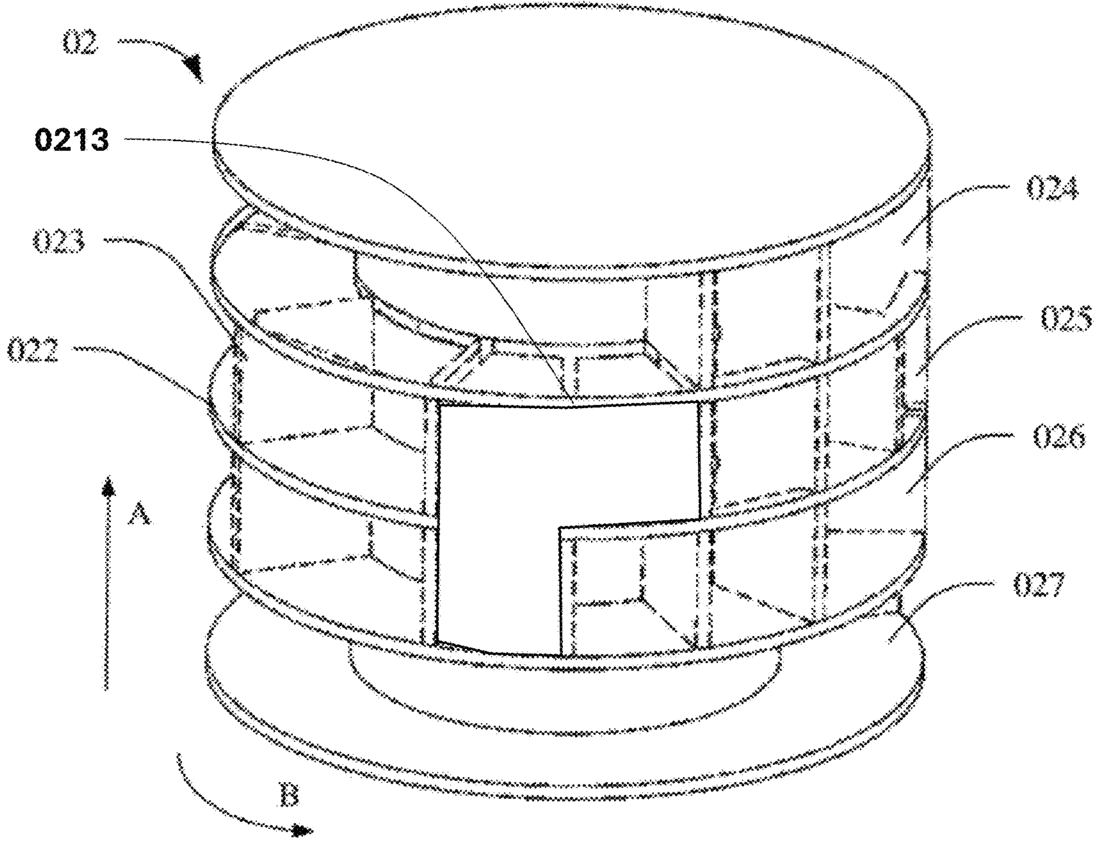
FIG. 9 is a schematic diagram of another structure of a valve core according to an embodiment.

FIG. 8 is a schematic diagram of a structure of the valve body according to an embodiment. FIG. 9 is a schematic diagram of a structure of the valve core according to an embodiment. As shown in FIG. 8 and FIG. 9, the multi-port valve in this embodiment is a four-phase ten-port valve. In this embodiment, the valve body 01 includes the body 012 and the block-shaped additional portion 013 that are of an integrally formed structure. The body 012 is a cylinder, and the outer surface of the block-shaped additional portion 013 is a plane. The valve body 01 includes ten vias 014, and further includes ten inner ports 0141 and ten outer ports 0142 that communicate with each other in a one-to-one correspondence manner. The inner ports 0141 are located on a circumferential side wall of the mounting cavity 011, the outer ports 0142 are located on the surface that is of the block-shaped additional portion 013 and that is away from the mounting cavity 011, and the ten outer ports 0142 are located on a same plane. In addition, as shown in FIG. 8, the inner port 0141 and the outer port 0142 communicate with each other through a straight-line via 014, and an extension direction of the straight-line via 014 is perpendicular to an axial direction of the mounting cavity 011. A preset distance between adjacent inner ports 0141 in the circumferential direction is relatively large. This helps improve sealing of the multi-port valve, and it is not easy to leak.

As shown in FIG. 9, the valve core 02 in this embodiment is a cylindrical valve core, and the valve core 02 is mounted in the mounting cavity 011 of the valve body 01. The multi-port valve may further include a driver. The driver is connected to the valve body 01, and is configured to drive the valve core 02 to rotate by a specified angle in the mounting cavity 011 of the valve body 01. The valve core 02 includes a core portion, a plurality of first separation plates 022, and a plurality of second separation plates 023. The first separation plate 022 is perpendicular to the axial direction A of the valve core, and the first separation plate 022 extends in the circumferential direction B of the valve core. However, the first separation plate 022 does not necessarily extend in the circumferential direction B of the valve core to an entire circumference of the valve core 02, and may locally extend. The second separation plate 023 is parallel to the axial direction A of the valve core, and the second separation plate 023 extends in the axial direction A of the valve core. Similarly, the second separation plate 023 only needs to connect two adjacent first separation plates 022. The plurality of first separation plates 022, the plurality of second separation plates 023, and the core portion fit to form the plurality of separation cavities 021.

The separation cavity 021 of the multi-port valve may have a plurality of forms. For example, the separation cavity 021 includes a first separation cavity 0211, a second separation cavity 0212, and a third separation cavity. The first separation cavity 0211 communicates with a plurality of inner ports 0141 arranged in the circumferential direction B of the valve core, and the second separation cavity 0212 can communicate with a plurality of inner ports 0141 arranged in the axial direction A of the valve core. Inner ports 0141 that communicate with a same separation cavity 021 communicate with each other. The third separation cavity is an L-shaped separation cavity 0213, and the third separation cavity includes a first part and a second part. It may be considered that the first part and the second part are perpendicularly disposed. The first part extends in the circumferential direction B of the valve core. For example, the first part communicates with two inner ports 0141 arranged in the circumferential direction B of the valve core. The second part extends in the axial direction A of the valve core. In another example, the second part communicates with two inner ports 0141 arranged in the axial direction A of the valve core. In another embodiment, there may be an overlapping inner port in the two inner ports 0141 communicating with the first part and the two inner ports 0141 communicating with the second part. In other words, the third separation cavity communicates with three inner ports 0141. Alternatively, the two inner ports 0141 communicating with the first part and the two inner ports 0141 communicating with the second part are completely different. In other words, the third separation cavity communicates with the four inner ports 0141.

Still refer to FIG. 9. The valve core 02 includes four layers of cavities arranged in the axial direction A of the valve core, and the four layers of cavities are sequentially a fourth layer of cavity 027, a third layer of cavity 026, a second layer of cavity 025, and a first layer of cavity 024 in the axial direction A of the valve core. There is a first separation plate 022 between any two adjacent cavities, and the first separation plate 022 may have an opening, so that cavities at adjacent layers can communicate with each other, to form a second separation cavity 0212, a third separation cavity, or the like.

Figure 10:
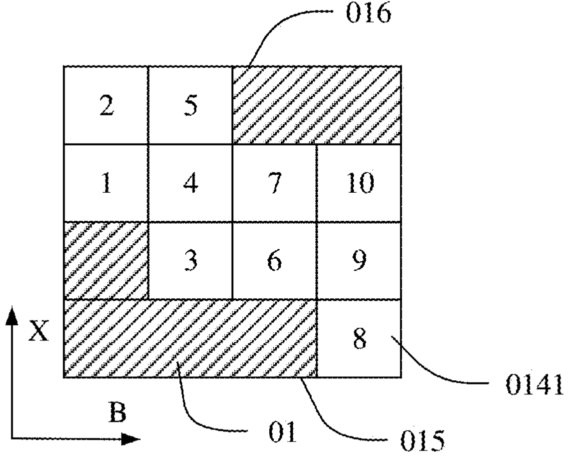
FIG. 10 is a schematic diagram of expansion of a surface of a mounting cavity of a valve body according to an embodiment.

FIG. 10 is a schematic diagram of expansion of a surface of the mounting cavity 011 of the valve body 01 according to an embodiment. As shown in FIG. 10, in this embodiment, the valve body 01 includes ten vias 014, and inner ports 0141 that are of the ten vias 014 and that are on the side wall of the body 012 are respectively a first port 1, a second port 2, a third port 3, a fourth port 4, a fifth port 5, a sixth port 6, a seventh port 7, an eighth port 8, a ninth port 9, and a tenth port 10. The first port 1 and the second port 2 are sequentially arranged in a first direction X. The third port 3, the fourth port 4, and the fifth port 5 are sequentially arranged in the first direction X. The sixth port 6 and the seventh port 7 are sequentially arranged in the first direction X. The eighth port 8, the ninth port 9, and the tenth port 10 are sequentially arranged in the first direction X. Two ends of the valve body 01 in the axial direction of the mounting cavity 011 are a first end 015 and a second end 016, and the first direction X is a direction in which the first end 015 faces the second end 016. In other words, the first direction X extends in the axial direction of the mounting cavity 011, and has a fixed pointing direction. The first port 1, the fourth port 4, the seventh port 7, and the tenth port 10 are sequentially arranged in the circumferential direction B of the valve core. The openings are located at several point positions in a matrix of four rows and four columns.

Figure 11:
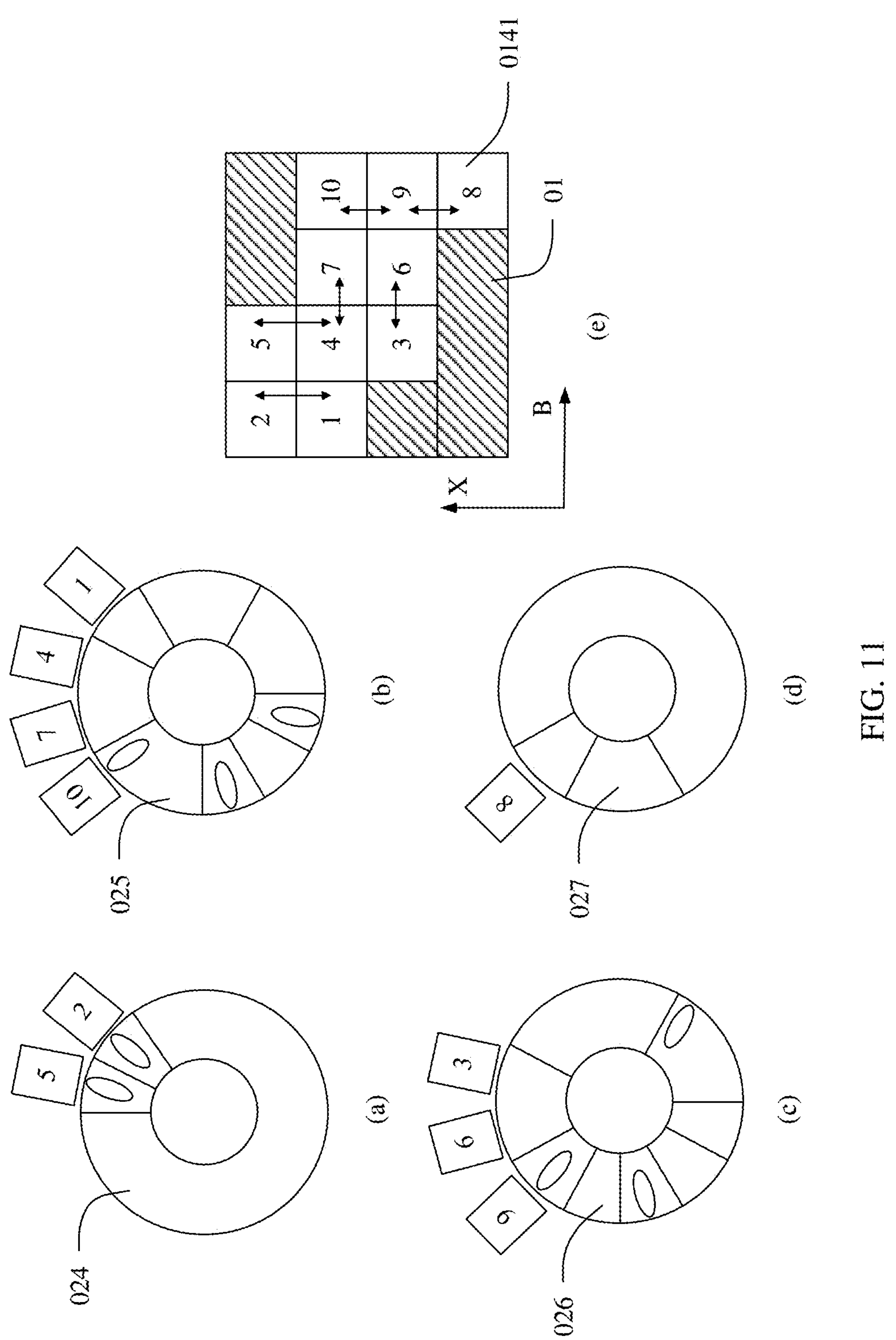
FIG. 11 is a schematic diagram of a working mode of a multi-port valve according to an embodiment.

FIG. 11 is a schematic diagram of a working mode of the multi-port valve according to an embodiment. The reference letters (a), (b), (c), and (d) in FIG. 11 are respectively sectional views of the first layer of cavity 024, the second layer of cavity 025, the third layer of cavity 026, and the fourth layer of cavity 027. A part marked with a ring in the figure means that the part communicates with a part of a next layer of cavity at this position or a first separation plate 022 between the part and a next layer of cavity has an opening, to form a second separation cavity 0212 or a third separation cavity. (e) in FIG. 11 is a schematic diagram of communication of inner ports 0141 in the working mode. Inner ports 0141 marked by arrows in the figure communicate with each other through a separation cavity 021.

As shown in FIG. 11, in an embodiment, the first port 1 and the second port 2 communicate with each other through a second separation cavity 0212, and the second separation cavity 0212 communicates with two inner ports 0141: the fourth port 4, the fifth port 5, and the seventh port 7 communicate with each other through a third separation cavity, and the third separation cavity communicates with three inner ports 0141: the third port 3 and the sixth port 6 communicate with each other through a first separation cavity 0211, and the first separation cavity 0211 communicates with two inner ports 0141: and the eighth port 8, the ninth port 9), and the tenth port 10 communicate with each other through a second separation cavity 0212, and the second separation cavity 0212 communicates with three inner ports 0141. In this embodiment, each inner port 0141 is in a working state.

Figure 12:
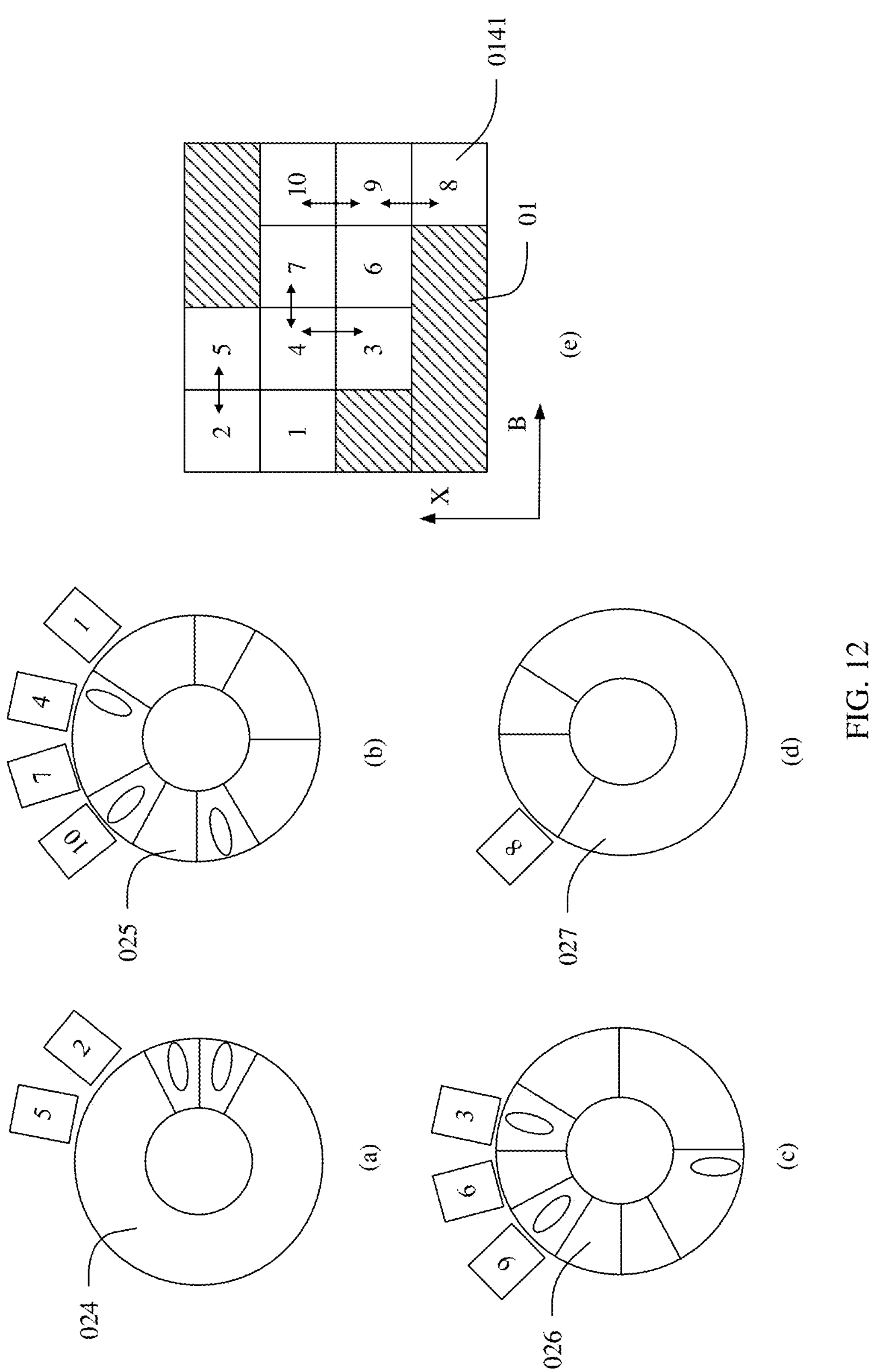
FIG. 12 is a schematic diagram of another working mode of a multi-port valve according to an embodiment.

FIG. 12 is a schematic diagram of another working mode of the multi-port valve according to an embodiment. The reference letters (a), (b), (c), and (d) in FIG. 12 are respectively sectional views of the first layer of cavity 024, the second layer of cavity 025, the third layer of cavity 026, and the fourth layer of cavity 027. A part marked with a ring in the figure means that the part communicates with a part of a next layer of cavity at this position or a first separation plate 022 between the part and a next layer of cavity has an opening, to form a second separation cavity 0212 or a third separation cavity. (e) in FIG. 12 is a schematic diagram of communication of inner ports 0141 in the working mode. Inner ports 0141 marked by arrows in the figure communicate with each other through a separation cavity 021.

As shown in FIG. 12, in another embodiment, the second port 2 and the fifth port 5 communicate with each other through a first separation cavity 0211, and the first separation cavity 0211 communicates with two inner ports 0141: the third port 3, the fourth port 4, and the seventh port 7 communicate with each other through a third separation cavity, and the third separation cavity communicates with three inner ports 0141: and the eighth port 8, the ninth port 9, and the tenth port 10 communicate with each other through a second separation cavity 0212, and the second separation cavity 0212 communicates with three inner ports 0141. In this embodiment, neither the first port 1 nor the sixth port 6 communicates with any inner port 0141 through a separation cavity. For example, the first port 1 and the sixth port 6 each may communicate with one separation cavity 021. In a further example, the separation cavity 021 communicating with the first port 1 communicates with only the first port 1, and the separation cavity 021 communicating with the sixth port 6 communicates with only the sixth port 6.

Figure 13:
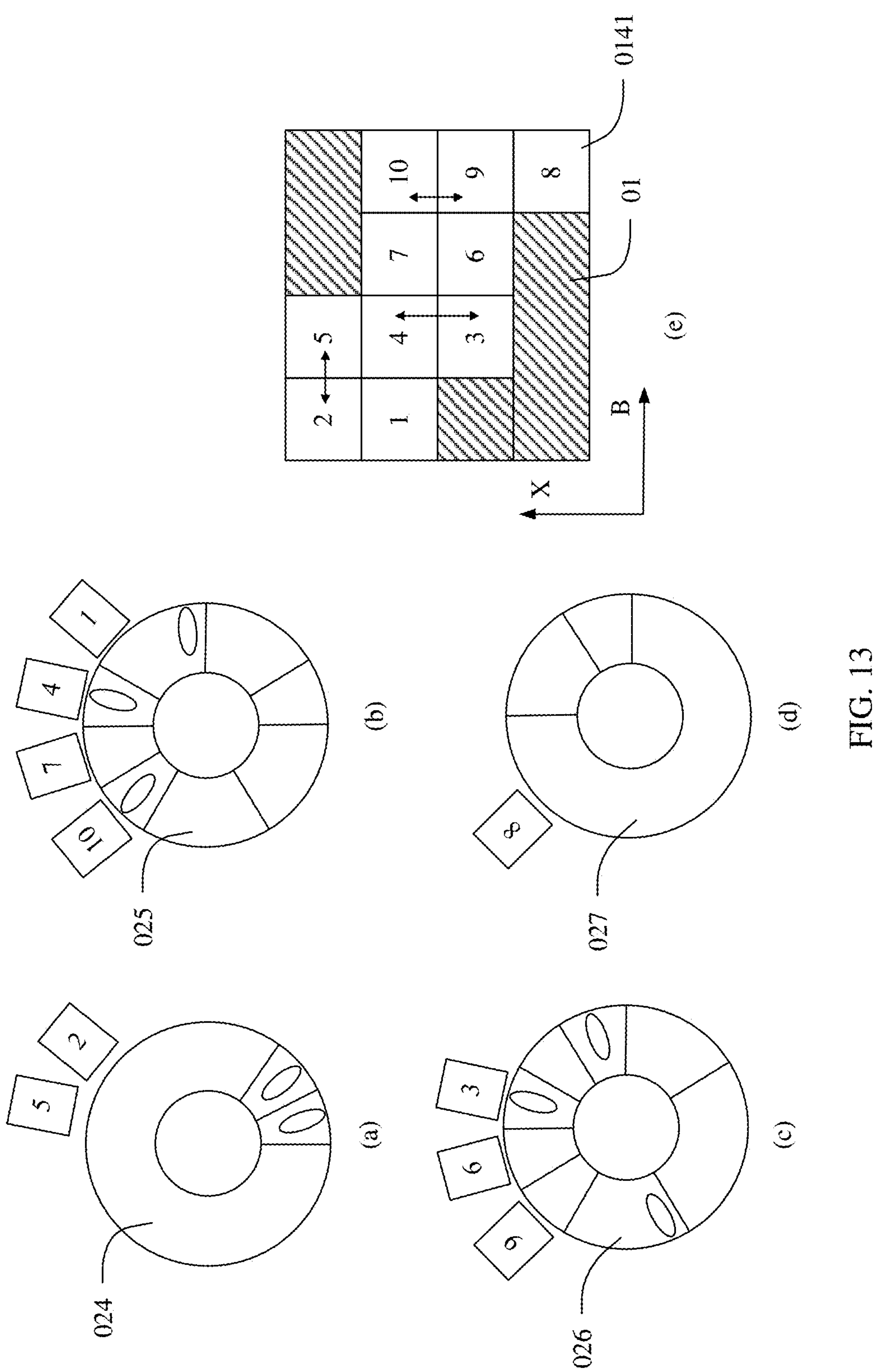
FIG. 13 is a schematic diagram of still another working mode of a multi-port valve according to an embodiment.

FIG. 13 is a schematic diagram of still another working mode of the multi-port valve according to an embodiment. The reference letters (a), (b), (c), and (d) in FIG. 13 are respectively sectional views of the first layer of cavity 024, the second layer of cavity 025, the third layer of cavity 026, and the fourth layer of cavity 027. A part marked with a ring in the figure means that the part communicates with a part of a next layer of cavity at this position or a first separation plate 022 between the part and a next layer of cavity has an opening, to form a second separation cavity 0212 or a third separation cavity. (e) in FIG. 13 is a schematic diagram of communication of inner ports 0141 in the working mode. Inner ports 0141 marked by arrows in the figure communicate with each other through a separation cavity 021.

As shown in FIG. 13, in still another embodiment, the second port 2 and the fifth port 5 communicate with each other through a first separation cavity 0211, and the first separation cavity 0211 communicates with two inner ports 0141: the third port 3 and the fourth port 4 communicate with each other through a second separation cavity 0212, and the second separation cavity 0212 communicates with two inner ports 0141: and the ninth port 9 and the tenth port 10 communicate with each other through another second separation cavity 0212, and the second separation cavity 0212 communicates with two inner ports 0141. In this embodiment, none of the first port 1, the sixth port 6, and the seventh port 7 communicates with any inner port 0141 through a separation cavity 021. For example, the first port 1, the sixth port 6, and the seventh port 7 each may communicate with only one separation cavity 021. In another example, the separation cavity 021 communicating with the first port 1 communicates with only the first port 1, the separation cavity 021 communicating with the sixth port 6 communicates with only the sixth port 6, and the separation cavity 021 communicating with the seventh port 7 communicates with only the seventh port 7.

Figure 14:
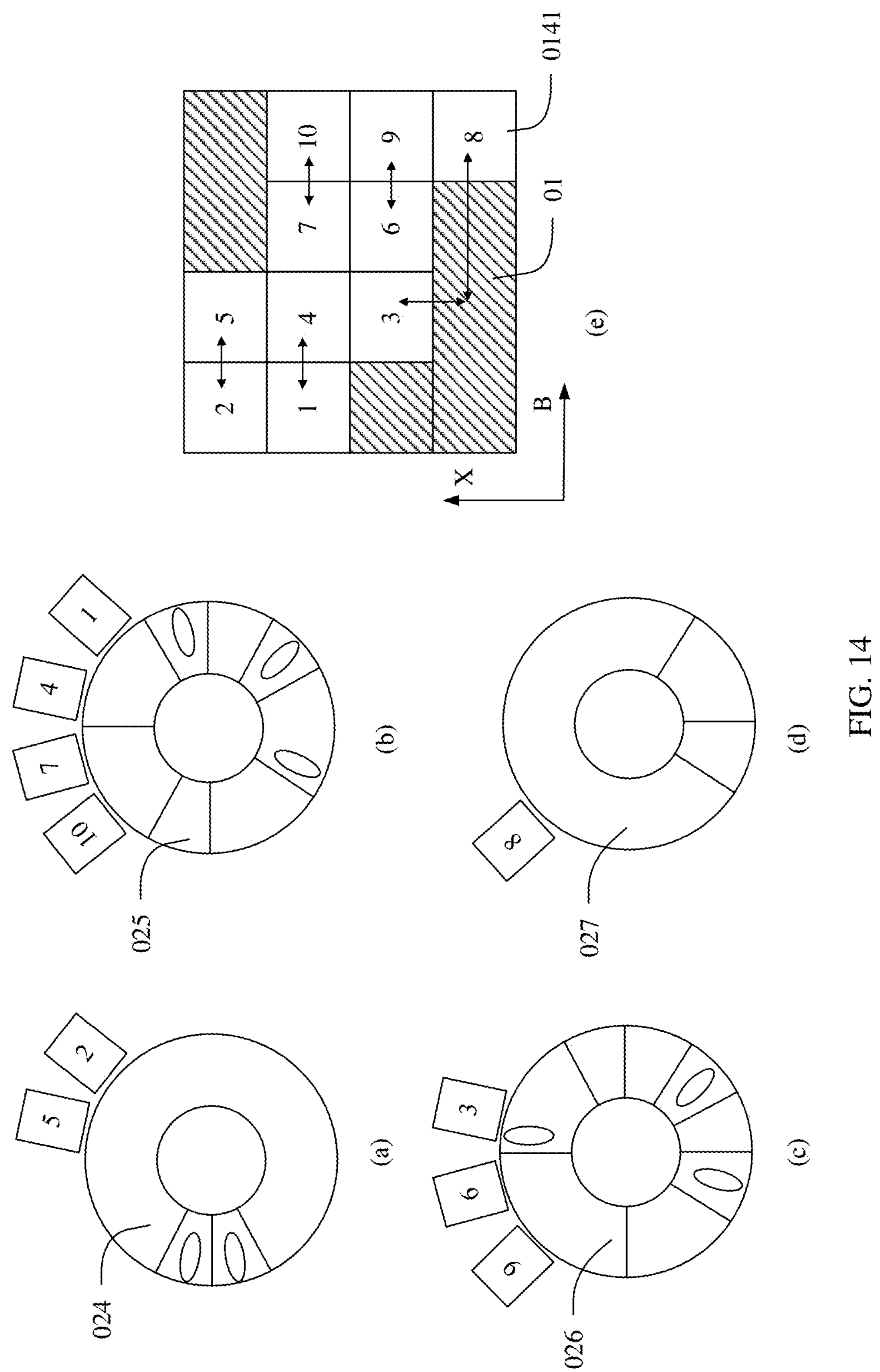
FIG. 14 is a schematic diagram of yet another working mode of a multi-port valve according to an embodiment.

FIG. 14 is a schematic diagram of yet another working mode of the multi-port valve according to an embodiment. The reference letters (a), (b), (c), and (d) in FIG. 14 are respectively sectional views of the first layer of cavity 024, the second layer of cavity 025, the third layer of cavity 026, and the fourth layer of cavity 027. A part marked with a ring in the figure means that the part communicates with a part of a next layer of cavity at this position or a first separation plate 022 between the part and a next layer of cavity has an opening, to form a second separation cavity 0212 or a third separation cavity. (e) in FIG. 14 is a schematic diagram of communication of inner ports 0141 in the working mode. Inner ports 0141 marked by arrows in the figure communicate with each other through a separation cavity 021.

As shown in FIG. 14, in yet another embodiment, the first port 1 and the fourth port 4 communicate with each other through a first separation cavity 0211, and the first separation cavity 0211 communicates with two inner ports 0141: the second port 2 and the fifth port 5 communicate with each other through another first separation cavity 0211, and the first separation cavity 0211 communicates with two inner ports 0141: the seventh port 7 and the tenth port 10 communicate with each other through still another first separation cavity 0211, and the first separation cavity 0211 communicates with two inner ports 0141: the sixth port 6 and the ninth port 9 communicate with each other through yet another first separation cavity 0211, and the first separation cavity 0211 communicates with two inner ports 0141: and the third port 3 and the eighth port 8 communicate with each other through a third separation cavity, and the third separation cavity communicates with two inner ports 0141. The third separation cavity can communicate with four inner ports and is configured to communicate with only two inner ports herein. In this embodiment, each inner port 0141 is in a working state.

In another embodiment, FIG. 11, FIG. 12, FIG. 13, and FIG. 14 show four working modes of the four-phase ten-port valve in this embodiment. In examples, the valve core 02 may be driven to rotate by a specified angle relative to the valve body 01, to adjust the four working modes of the four-phase ten-port valve.

It is clear that a person skilled in the art can make various modifications and variations to the embodiments without departing from their scope. The embodiments are intended to cover these modifications, variations, and their equivalent technologies.

What is claimed is:

1. A temperature control system, comprising:

a plurality of liquid pipelines and a multi-port valve, wherein the multi-port valve comprises a valve body and a valve core, the valve body has a mounting cavity and the valve core is mounted in the mounting cavity, the valve body comprises a body and a block-shaped additional portion, the mounting cavity is located on the body, the block-shaped additional portion is attached to at least a part of a side wall of the body, the valve body further comprises a plurality of vias, each via of the plurality of vias penetrates the block-shaped additional portion and a corresponding side wall of the body, each liquid pipeline of the plurality of liquid pipelines is configured to communicate with one via, and there is a battery pack on at least one liquid pipeline; and a peripheral side of the valve core comprises a plurality of separation cavities, at least two separation cavities of the plurality of separation cavities are arranged in an axial direction of the valve core, and each separation cavity of the plurality of separation cavities is configured to communicate with one or more vias, wherein a plurality of first openings is provided on an inner side wall of the body, a first opening of the plurality of first openings is an inner port of the via, a plurality of second openings is provided on an outer surface of the block-shaped additional portion, a second opening of the plurality of second openings is an outer port of the via, and each liquid pipeline communicates with one second opening, wherein the plurality of separation cavities of the valve core comprise a third separation cavity, the third separation cavity comprises a first part and a second part, the first part communicates with two inner ports arranged in the circumferential direction of the valve core, and the second part communicates with two inner ports arranged in the axial direction of the valve core.

2. The temperature control system according to claim 1, wherein there is a heat exchanger on at least one liquid pipeline of the plurality of liquid pipelines, and the heat exchanger is further located on a heat exchange loop comprising a compressor.

3. The temperature control system according to claim 1, wherein the plurality of separation cavities of the valve core comprise a first separation cavity, and the first separation cavity of the plurality of separation cavities communicates with a plurality of inner ports arranged in a circumferential direction of the valve core.

4. The temperature control system according to claim 3, wherein the valve body comprises eight vias, eight inner ports are arranged into a matrix of two rows and four columns, and inner ports in each row are arranged in the circumferential direction of the valve core.

5. The temperature control system according to claim 4, wherein the valve core comprises four first separation cavities, the four first separation cavities are arranged into a matrix of two rows and two columns, and each first separation cavity communicates with two inner ports arranged in the circumferential direction of the valve core.

6. The temperature control system according to claim 4, wherein the valve core comprises two first separation cavities and two second separation cavities, the two first separation cavities are arranged in the axial direction of the valve core, the two second separation cavities are arranged in the circumferential direction of the valve core, each first separation cavity communicates with the two inner ports arranged in the circumferential direction of the valve core, and each second separation cavity communicates with two inner ports arranged in the axial direction of the valve core.

7. The temperature control system according to claim 3, wherein the valve body comprises ten vias, and inner ports of the ten vias that are on the side wall of the body are respectively a first port, a second port, a third port, a fourth port, a fifth port, a sixth port, a seventh port, an eighth port, a ninth port, and a tenth port, wherein the first port and the second port are sequentially arranged in a first direction, the third port, the fourth port, and the fifth port are sequentially arranged in the first direction, the sixth port and the seventh port are sequentially arranged in the first direction, the eighth port, the ninth port, and the tenth port are sequentially arranged in the first direction, two ends of the valve core in the axial direction are a first end and a second end, and the first direction is a direction in which the first end faces the second end; and the first port, the fourth port, the seventh port, and the tenth port are sequentially arranged in the circumferential direction of the valve core.

8. The temperature control system according to claim 7, wherein the first port and the second port communicate with each other through a second separation cavity, the fourth port, the fifth port, and the seventh port communicate with each other through a third separation cavity, the third port and the sixth port communicate with each other through a first separation cavity, and the eighth port, the ninth port, and the tenth port communicate with each other through another second separation cavity.

9. The temperature control system according to claim 7, wherein the second port and the fifth port communicate with each other through a first separation cavity, the third port, the fourth port, and the seventh port communicate with each other through a third separation cavity, and the eighth port, the ninth port, and the tenth port communicate with each other through a second separation cavity.

10. The temperature control system according to claim 7, wherein the second port and the fifth port communicate with each other through a first separation cavity, the third port and the fourth port communicate with each other through a second separation cavity, and the ninth port and the tenth port communicate with each other through another second separation cavity.

11. The temperature control system according to claim 7, wherein the first port and the fourth port communicate with each other through a first separation cavity, the second port and the fifth port communicate with each other through another first separation cavity, the seventh port and the tenth port communicate with each other through still another first separation cavity, the sixth port and the ninth port communicate with each other through yet another first separation cavity, and the third port and the eighth port communicate with each other through a third separation cavity.

12. The temperature control system according to claim 1, wherein the plurality of separation cavities of the valve core comprise a second separation cavity, and the second separation cavity communicates with a plurality of inner ports arranged in the axial direction of the valve core.

13. The temperature control system according to claim 1, wherein the valve core comprises a plurality of separation plates, the plurality of separation plates comprise a first separation plate and a second separation plate, the first separation plate is perpendicular to the axial direction of the valve core, the second separation plate is parallel to the axial direction of the valve core, and the plurality of separation plates form the plurality of separation cavities.

14. The temperature control system according to claim 1, wherein the via extends: along a straight line, in a bending manner, or in a curving manner.

15. The temperature control system according to claim 1, wherein the body is a cylinder, the block-shaped additional portion has a groove portion, and the groove portion accommodates at least a part of a side wall of the cylinder.

16. An energy storage system, comprising:

a battery pack, and a temperature control system configured to control a temperature of the battery pack;

the temperature control system comprises a plurality of liquid pipelines and a multi-port valve, wherein the multi-port valve comprises a valve body and a valve core, the valve body has a mounting cavity, the valve core is mounted in the mounting cavity, the valve body comprises a body and a block-shaped additional portion, the mounting cavity is located on the body, the block-shaped additional portion is attached to at least a part of a side wall of the body, the valve body further comprises a plurality of vias, each via penetrates the block-shaped additional portion and a corresponding side wall of the body, each liquid pipeline is configured to communicate with one via, and there is a battery pack on at least one liquid pipeline; and a peripheral side of the valve core comprises a plurality of separation cavities, at least two separation cavities of the plurality of separation cavities are arranged in an axial direction of the valve core, and each separation cavity of the plurality of separation cavities is configured to communicate with one or more vias, wherein a plurality of first openings is provided on an inner side wall of the body, a first opening of the plurality of first openings is an inner port of the via, a plurality of second openings is provided on an outer surface of the block-shaped additional portion, a second opening of the plurality of second openings is an outer port of the via, and each liquid pipeline communicates with one second opening, wherein the plurality of separation cavities of the valve core comprise a third separation cavity, the third separation cavity comprises a first part and a second part, the first part communicates with two inner ports arranged in the circumferential direction of the valve core, and the second part communicates with two inner ports arranged in the axial direction of the valve core.

17. A multi-port valve, comprising:

a valve body, and a valve core, the valve body has a mounting cavity, the valve core is mounted in the mounting cavity, the valve body comprises a body and a block-shaped additional portion, the mounting cavity is located on the body, the block-shaped additional portion is attached to at least a part of a side wall of the body, the valve body further comprises a plurality of vias, and each via of the plurality of vias penetrates the block-shaped additional portion and a corresponding side wall of the body; and a peripheral side of the valve core comprises a plurality of separation cavities, at least two separation cavities of the plurality of separation cavities are arranged in an axial direction of the valve core, and each separation cavity of the plurality of separation cavities is configured to communicate with one or more vias, wherein a plurality of first openings is provided on an inner side wall of the body, a first opening of the plurality of first openings is an inner port of the via, a plurality of second openings is provided on an outer surface of the block-shaped additional portion, a second opening of the plurality of second openings is an outer port of the via, wherein the plurality of separation cavities of the valve core comprise a third separation cavity, the third separation cavity comprises a first part and a second part, the first part communicates with two inner ports arranged in the circumferential direction of the valve core, and the second part communicates with two inner ports arranged in the axial direction of the valve core.

* * * * *